July 31, 1962     B. M. TESSEM     3,046,786

CONDITION RESPONSIVE DEVICE

Filed Aug. 12, 1958

INVENTOR.
BERNT M. TESSEM
BY
ATTORNEY

3,046,786
CONDITION RESPONSIVE DEVICE
Bernt M. Tessem, Minneapolis, Minn., assignor to Minneapolis-Honeywell Regulator Company, Minneapolis, Minn., a corporation of Delaware
Filed Aug. 12, 1958, Ser. No. 754,573
9 Claims. (Cl. 73—356)

The present invention relates generally to a condition responsive device which is arranged to indicate extent of exposure above a certain minimum temperature point, and more particularly to such an apparatus that is arranged to visually indicate the integrated time-temperature exposure of contents of a frozen food package or the like above a certain minimum temperature level. Apparatus of this sort are designed to indicate whether or not the contents of a frozen food package have been permitted to exceed certain minimum temperature requirements for sufficient periods of time in order to cause any undue deterioration or spoilage thereof. It is well known that the rate of deterioration of food and particularly frozen food is a function of temperature, this rate becoming quite rapid at temperatures at or near the freezing point of the food. On the other hand, at certain minimum temperature points the rate of deterioration is substantially nil. This temperature varies for different foods, and for certain foods, this minimum temperature may be in the range of 12° F. while for others this temperature may be in the range of minus 10° F. The apparatus of the present invention is designed to indicate the extent of exposure, if any, to temperatures exceeding this particular minimum safe temperature, this device giving a time-temperature integrated indication of the exposure history of the package.

In the past, it has been proposed to make devices for this purpose by various diverse means. These include the preparation of a chemical indicator positioned at one extreme of an absorbent material such as a blotter or the like while at the other end a material is placed which is arranged to traverse the length of the absorbent material at a rate determined by the temperature the material being such as to cause a change in color in the indicator upon contact therewith. Devices such as this rely strictly and solely on the viscosity of the traversing material at the various temperatures encountered, and hence the device is somewhat limited in its application to different foods with differing rates of spoiling. In addition, the devices of this sort make it extremely difficult if not impossible to obtain an accurate integrated history of exposure for the package. Among other schemes are the use of fugitive figures which are destroyed upon melting, enzyme-indicator combinations which are arranged to change color upon exposure to time-temperature conditions. Accordingly, these devices also make it difficult if not impossible to ascertain the time-temperature integrated history exposure to certain unsafe conditions, and hence the extent of spoilage can not be readily determined. The present invention contributes additional variables to control the indicating system, thus making the device adaptable to a substantial range of materials.

According to the present invention, a galvanic cell is prepared along a porous medium, the galvanic cell employing a pair of spaced dissimilar metal electrodes, and the porous medium being impregnated with an electrolyte and an indicator such as phenolphthalein or the like, which has one color in the presence of the electrolyte. Accordingly, subsequent to impregnation of the filter paper with the electrolyte, electrolytic action will occur at the metal electrodes, there being an external connection therebetween. The electrolytic action will cause an oxidation-reduction reaction to occur at the interface and accordingly a reaction product such as hydroxyl, hydrogen (or hydronium), metal ions or the like will be formed. The reaction product formed at the electrode will migrate across the treated porous medium at a rate determined by the time-temperature relationship of the environment. This rate is a function of several temperature dependent variables including the viscosity, the potential difference existing between the electrodes, the rate of generation of the indicating ion which is a temperature dependent function of the kinetics of electrode reaction. In addition, the rate of migration is also dependent upon non-temperature sensitive variables such as electrode geometry and configuration. Inasmuch as the presence or absence of the reaction product may be readily ascertained either by its own inherent color or by reaction with the indicator, a colored interface along the extent of the porous medium where the reaction product is present in sufficient quantities will be present. The relative length of the color converted area is therefore an indication of the integrated extent of exposure of the apparatus to unsafe temperatures. Of course, if a certain minimum temperature has not been exceeded, the electrolyte remains frozen and there will be substantially no electrochemical reaction at the electrodes. Accordingly the rate of migration under these conditions, of any reaction product from the electrode interfaces will be substantially nil.

It is therefore an object of the present invention to provide an irreversible visual indicating apparatus for frozen food packages or the like, the apparatus employing a galvanic cell arrangement for indicating the integrated time-temperature exposure to unsafe environmental or storage conditions.

It is a further object of the present invention to provide a galvanic cell arrangement employing a pair of spaced dissimilar metals positioned along a porous medium impregnated with an electrolyte and an indicator solution, the electrolyte being arranged to undergo an oxidation-reduction reaction at the electrode interfaces and form a reaction product, this reaction product being detectable either directly by its own inherent color or by the indicator solution; the extent of migration of the reaction product being an indication of the integrated time-temperature storage history of the package.

Other and further objects of the present invention will become apparent upon a study of the following specification, appended claims, and the accompanying drawings, wherein:

Figure 1:
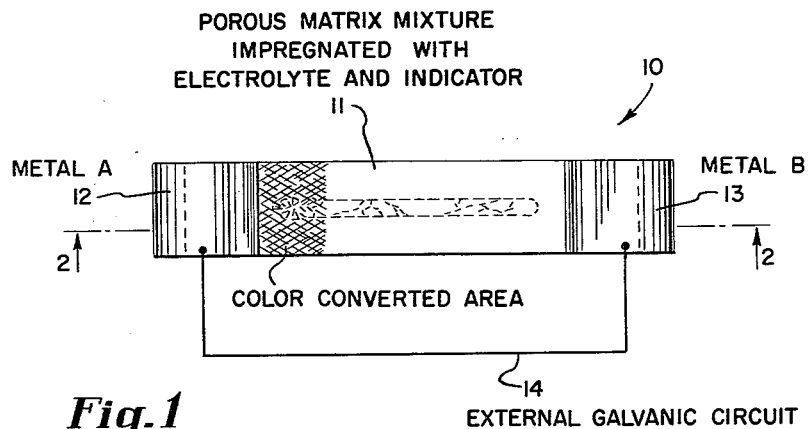
FIGURE 1 is a top plan view of a preferred modification of the present invention and showing the device as it appears subsequent to exposure to a thawing condition for a certain period of time.

According to the preferred modification of the present invention, the indicating apparatus 10 includes a porous matrix medium 11 such as filter or blotting paper or the like, having a pair of dissimilar metallic bodies 12 and 13 such as copper and tin respectively attached to spaced intervals along the paper 11. An external conductor such as the wire 14 is arranged to complete a galvanic circuit which passes through the porous medium 11. The apparatus may further preferably be provided with a rupturable vial 15 which is arranged to be positioned adjacent to the porous medium 11 and which upon rupture thereof and subsequent thawing of the electrolyte will impregnate the porous medium with a solution of an electrolyte such as an aqueous eutectic solution of potassium chloride. The vial 15 is preferably prepared from a non-elastic frangible substance such as glass or the like which will burst when the contents expand upon freezing. The charge within the vial 15 may also include an indicator such as phenolphthalein, this being a preferred indicator for use with alkali metal cation containing electrolytes. Alternatively, the paper of course, may be impregnated with the indicator prior to its being assembled. The electrodes 12 and 13 are selected from dissimilar metallic substances and preferably but not necessarily, one of the electrodes is selected from the metals above hydrogen in the electromotive force series of elements. The relative spacing of the dissimilar metals in the E.M.F. series elements will in conjunction with the electrolyte composition, of course determine the potential difference existing across the impregnated porous medium, this potential difference being employed as a driving force for the ions in the electrolyte and for the ions of the reaction product. The Nernst equation defines the temperature dependence of the electrical potential of galvanic or electrolytic cells of this type. Various families of slopes or curves of relative length of migration of the reaction product versus time at constant temperatures may be determined by the mere selection of suitable electrode materials electrolytes and electrode configurations and spacings to be employed. The devices may be designed to show a certain extent of color change after exposure of, for example, two hours at 20° F. or two weeks at 50° F.

Figure 3:
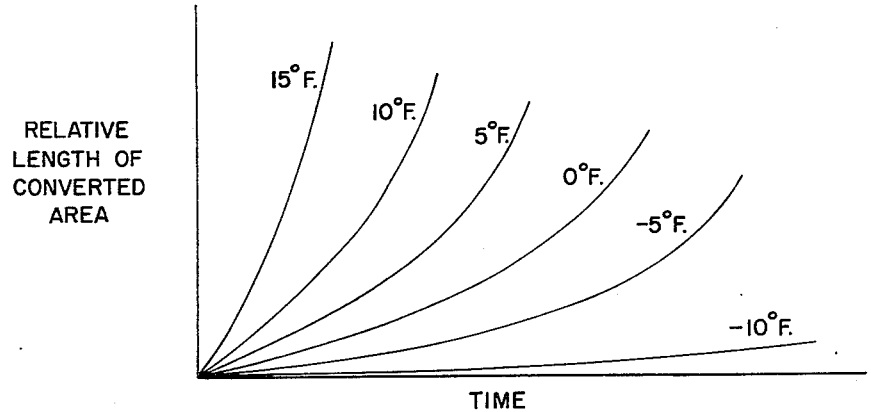
FIGURE 3 is a graph showing typical response curves plotting the relative lengths of converted areas versus time of exposure at certain constant temperatures.

In operation, the apparatus functions as follows. The rupturable vial is filled with an electrolyte solution and arranged in physical contact with the indicator impregnated porous filter paper medium 11. The apparatus is then subjected to a temperature such as in the range of 20° F. to minus 10° F., depending upon choice of electrolyte composition, which is sufficiently cold to freeze the electrolyte solution and accordingly and consequently rupture the retaining vial. Therefore, the filter paper will become impregnated with the electrolyte solution upon subsequent warming to the melting point of the electrolyte solution and the device is then operative. So long as the temperature remains below the melting point of the electrolyte solution, substantially no reaction occurs at the electrode-medium interfaces and this inoperative condition will continue so long as the temperature remains below the melting point of the electrolyte solution. Upon exposure to a temperature which exceeds the melting point of the electrolyte solution, the paper becomes impregnated and the ionic mobility is increased to a point where substantial electrolytic action occurs in the galvanic cell arrangement. Accordingly, in one embodiment of the device when aqueous KCl is used as the electrolyte hydroxyl ions are created at the more noble electrode and, inasmuch as the hydroxyl ion is a highly mobile ion and capable of carrying charges at a rate which exceeds that of other anions, most of the current will be carried by this ion. Accordingly, the presence of the hydroxyl ion is indicated by a color change in the phenolphthalein indicator and the degree of travel of the hydroxyl ions across the porous medium provides an indication of the integrated time-temperature history of the environment to which the apparatus has been exposed. Reference is made to FIGURE 3 wherein the relative length of converted area is plotted against time at constant temperatures. It is seen, therefore that at temperatures well below the freezing point of the electrolyte solution such as minus 10° F., very little if any color change occurs due to the absence of a detectable ion, and this condition will be maintained substantially indefinitely so long as the minimum temperature is not exceeded. As the temperature is increased therefore, the rate of travel will also be increased and this is manifested in the length of converted area in the impregnated medium. It should be noted, however, from FIGURE 3 that even at temperatures as low as −10° F. a finite conversion takes place in the indicator medium. The rate of conversion at this low temperature is only a small part of the rate at higher temperatures. The rate of deterioration of frozen food products tends to be similar to the response of the frozen food indicator of the invention. At temperatures below −10° F. deterioration of most foods is substantially nil, while at increasing temperatures the rate of deterioration is accelerated. For a complete discussion of frozen food deteriorations see a series of articles appearing in the Food Technology magazine of 1957 beginning at Volume XI, No. I, entitled: "The Time Temperature Tolerance of Frozen Foods."

Although substantially any electrolyte may be employed in this apparatus, it is preferred that the electrolyte be one that includes a cation, which will not so react with the hydroxyl ions as to effectively remove them from solution as for example by forming an insoluble metal hydroxide. Of course, it will be appreciated that other electrolytes may be employed wherein hydrogen hydronium or other ions are formed in the oxidation-reduction reaction at an electrode interface, the presence of these ions being readily indicated either by their own color properties or by the use of a suitable indicator. In this connection, the operation of the device will be substantially the same as that heretofore described.

In order to obtain sharp freezing points and thawing it is preferable to employ an eutectic electrolyte solution such as, for example, potassium chloride-$H_2O$ eutectic. This solution has a freezing point at about 12° F., this being a relatively sharp point. In some applications where it is desirable that the initiation of the galvanic action be of a more gradual nature, it is preferable that the electrolyte composition be selected so as not to be the eutectic composition.

Of course, it will be appreciated that the rupturable vial 15 is not essential to operation of a device of this sort. In this connection the porous medium 11 may be impregnated with an electrolyte and an indicator solution prior to its being placed within a frozen package or the like. Operation will, of course be substantially the same as that shown hereinabove with the exception that the galvanic action, which may be initiated by an external switch or by the act of assembly immediately prior to use, may occur prior to its being frozen and hence such precise accuracy is not available in this sort of device. Of course, substantially no difference would occur in operation of the device if the apparatus were attached to the package subsequent to the freezing thereof and shortly after suitable assembly of the active components.

Figure 2:
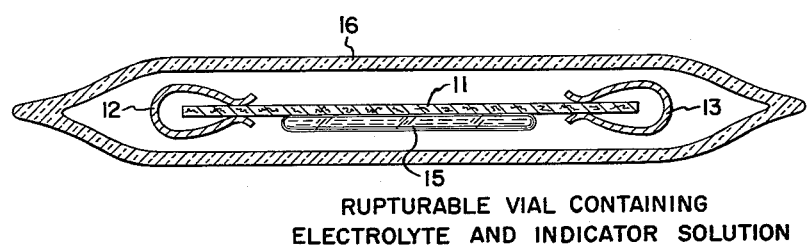
FIGURE 2 is a vertical sectional view taken along the lines and in the direction of the arrows 2—2 of FIGURE 1 and showing the device in unused condition; and also showing a transparent covering about the device.

It is generally preferable to enclose the apparatus in an enclosure to protect it from external influences and also to assist in retaining the particles of broken glass. Such an enclosure is shown at 16 in FIGURE 2.

Of course, other embodiments may be made of the present invention without departing from the spirit and scope of the present invention. It will be understood, therefore, that these specific embodiments given above are only intended to be illustrative and are not to be construed as a limitation upon the scope of the invention.

I claim as my invention:

1. Apparatus for indicating the extent of exposure to a temperature exceeding a certain minimum comprising an impregnated porous matrix medium having a pair of dissimilar metal bodies arranged in contact with said medium at spaced interfaces to form a galvanic cell, said porous medium being impregnated with a certain ionized electrolyte and certain indicator to form a conductive path in a portion of the galvanic cell, the ions of said electrolyte being capable of undergoing an oxidation-reduction reaction at said interfaces to form a certain reaction product, said reaction product migrating along said porous medium, said indicator being sensitive to the presence of said reaction product and reacting therewith to indicate visually the presence thereof, said migration being at a rate proportional to both time and to the increase in temperature above said minimum.

2. Apparatus for indicating the extent of exposure to a temperature exceeding a certain minimum comprising an impregnated matrix medium having a pair of dissimilar metal bodies arranged in spaced contact with said medium at spaced interfaces and arranged to form a galvanic cell, said porous medium being impregnated with an aqueous solution of a water soluble electrolyte and a certain indicator and forming a conductive path in a portion of the galvanic cell, the ionic portion of said electrolyte being capable of undergoing an oxidation-reduction reaction at said interfaces to form an ionic reaction product, said indicator being sensitive to the presence of said reaction product and undergoing a color change when in contact with said ionic reaction product, said reaction product migrating along said porous medium at a rate proportional to the increase in temperature above said minimum to provide a visual indication of the extent of said migration.

3. Apparatus for indicating the extent of exposure to a temperature exceeding a certain minimum comprising a porous matrix medium having a pair of dissimilar metal bodies arranged in contact with said medium at spaced interfaces and arranged to form a galvanic cell, and having a closed rupturable vial containing a charge of an aqueous solution of a certain electrolyte and an indicator therein situated adjacent a surface thereof, said vial being arranged to rupture on freezing of a portion of the charge therein and thereby impregnate said porous matrix medium with said electrolyte and indicator and thereby form a conductive path in the galvanic cell, said electrolyte being capable of undergoing an oxidation-reduction reaction at said interfaces to form a detectable reaction product, said reaction product migrating along said porous matrix medium at a rate proportional to the temperature above said minimum, said indicator solution being sensitive to the presence of said reaction product and undergoing a color change in the presence thereof to thereby indicate the extent of migration of said reaction product.

4. The apparatus of claim 1 being further characterized in that said electrolyte is selected from the class consisting of electrolytes having soluble hydroxides.

5. The apparatus of claim 1 being further characterized in that said electrolyte consists essentially of an electrolyte having an alkali metal cation.

6. Apparatus for indicating the extent of exposure to a temperature exceeding a certain minimum comprising an impregnated porous matrix medium having a pair of dissimilar metal bodies arranged in contact therewith at spaced interfaces therealong and arranged to form a galvanic cell, at least one of said metal bodies being positioned above hydrogen in the electromotive force series of elements, said porous matrix medium being impregnated with a certain electrolyte and a certain indicator and forming a conductive path in the galvanic cell, said electrolyte being capable of undergoing an oxidation-reduction reaction at said interfaces to form a detectable reaction product, said reaction product migrating along said porous matrix medium at a rate proportional to the temperature above said minimum, said indicator solution being sensitive to the presence of said reaction product to thereby visually indicate the extent of migration of said reaction product.

7. A device for visually indicating the extent to which frozen foods and the like have been exposed to a temperature exceeding a safe predetermined minimum comprising a porous matrix medium containing an electrolyte composition which changes color upon contact with ions migrating across said medium, a first metal body in contact with said medium near one end thereof, a second dissimilar metal body in contact with said medium near the other end thereof, and an external conductor connecting said metal bodies, said electrolyte composition being capable of reacting with said first metal body to form ions which migrate through said medium at a rate proportional to time and to the increase in temperature above said predetermined minimum and which ions produce a color change in said electrolyte composition during migration.

8. A device for visually indicating the extent to which frozen foods and the like have been exposed to a temperature exceeding a safe predetermined minimum comprising a porous matrix medium, a first metal body in contact with said medium near one end thereof, a second dissimilar metal body in contact with said medium near the other end thereof, a rupturable vial disposed adjacent said medium and containing an electrolyte composition, which composition upon rupture of said vial is capable of impregnating said medium and reacting with one of said metal bodies to form ions which migrate through said medium at a rate proportional both to time and to the increase in temperature above said predetermined minimum and which ions produce a color change in the electrolyte composition during migration, an external conductor connecting said metal bodies, and an enclosure which houses said vial, said medium, said metal bodies, and said external conductor.

9. Apparatus for indicating extent of exposure to a temperature exceeding a certain minimum comprising an impregnated porous matrix having a pair of dissimilar metal bodies arranged in contact with said matrix medium at spaced interfaces and arranged to form a galvanic cell, said porous medium being impregnated with a certain ionized electrolyte and an indicator substance and forming a conductive path in a portion of the galvanic cell, the ions of said electrolyte being capable of undergoing an oxidation-reduction reaction at said interfaces and to form a certain first reaction product, said first reaction product migrating along said porous matrix medium by influence of said galvanic cell, said first reaction product reacting with said indicator substance to form a second reaction product capable of visually indicating the extent of the migration of said first reaction product, thereby indicating the time at which said indicator has been at a temperature exceeding a certain minimum.

References Cited in the file of this patent

UNITED STATES PATENTS

| | | |
|---|---|---|
| 665,679 | Hall | Jan. 8, 1901 |
| 713,652 | Kitsee | Nov. 18, 1902 |
| 856,162 | Kitsee | June 4, 1907 |
| 1,497,388 | Sterling | June 10, 1924 |
| 2,594,711 | Andre | Apr. 29, 1952 |

FOREIGN PATENTS

| | | |
|---|---|---|
| 528,077 | Great Britain | Oct. 22, 1940 |